(12) United States Patent
Fischer et al.

(10) Patent No.: US 8,689,503 B2
(45) Date of Patent: Apr. 8, 2014

(54) EMBEDDABLE DEVICE FOR PASSING CONDUITS THROUGH A CONSTRUCTIONAL COMPONENT

(75) Inventors: Marco Fischer, Denver, CO (US); Thomas Monden, Stetten (DE)

(73) Assignee: Hilti Aktiengesellschaft, Schaan (LI)

( * ) Notice: Subject to any disclaimer, the term of this patent is extended or adjusted under 35 U.S.C. 154(b) by 1098 days.

(21) Appl. No.: 11/788,591

(22) Filed: Apr. 19, 2007

(65) Prior Publication Data

US 2008/0034687 A1 Feb. 14, 2008

(30) Foreign Application Priority Data

Apr. 20, 2006 (DE) ...................... 20 2006 006 361 U

(51) Int. Cl.
*E04F 17/08* (2006.01)
(52) U.S. Cl.
CPC ............. *E04F 17/08* (2013.01); *E04F 2203/04* (2013.01); *E04F 2290/02* (2013.01)
USPC ....................................................... 52/220.8
(58) Field of Classification Search
USPC ................................. 52/220.8; 403/364, 186
See application file for complete search history.

(56) References Cited

U.S. PATENT DOCUMENTS

| 3,731,448 A * | 5/1973 | Leo ............................... 52/592.1 |
| 3,908,323 A * | 9/1975 | Stout ................................. 52/99 |
| 6,311,734 B1 * | 11/2001 | Petrovic ........................... 285/45 |
| 2003/0101668 A1 * | 6/2003 | Monden et al. .............. 52/220.8 |

FOREIGN PATENT DOCUMENTS

DE          2411521          10/1975

* cited by examiner

*Primary Examiner* — Michael Safavi
(74) *Attorney, Agent, or Firm* — Abelman, Frayne & Schwab

(57) ABSTRACT

An embeddable device (11, 41) for passing conduits through a constructional component (6), includes a tubular housing (12, 42) having an attachment flange (14) provided at one of its ends for temporary securing the device on a formwork (7) of the subsequently cast constructional component (6), and a receptacle (15) for isolation means (8) and which surrounds, at least regionwise, an axially extending through-opening (16). A connection device (21, 44) connects a plurality of embeddable devices (11) with each other and includes at least one connection element (23, 24, 26, 27) provided on the housing (12) and extending parallel to a plane (E) defined by the attachment flange (14) at a distance from the plane (E).

13 Claims, 5 Drawing Sheets

EMBEDDABLE DEVICE FOR PASSING CONDUITS THROUGH A CONSTRUCTIONAL COMPONENT

BACKGROUND OF THE INVENTION

1. Field of the Invention

The present invention relates to an embeddable device for passing conduits through a constructional component and including a tubular housing having an attachment flange provided at one of its ends for temporary securing the device on a formwork of the subsequently cast constructional component and a receptacle for isolation means and which surrounds, at least regionwise, an axially extending through-opening, and a connection device for connecting a plurality of embeddable devices with each other.

2. Description of the Prior Art

When designing and building buildings, on many occasions, there are provided, in walls and ceilings, leadthroughs for conduits such as pipes, cables and the like, through which only in a later constructional phase, e.g., in an expansion phase, conduits are passed. In this way, it is prevented that pipes, cables, or the like suffer any damage in earlier constructional phases. E.g., in order to provide a leadthrough in a ceiling or a wall, it is already during working with a formwork, a place holder is secured on the formwork and then becomes cast-in in the produced constructional component, such as a concrete ceiling or a concrete wall during casting of the same. The open leadthroughs present a danger that, e.g., in case of fire, they would facilitate propagation of the fire. Further, e.g., water may flow through the open leadthroughs from one room into another.

Therefore, there are provided cast-in devices which include a tubular housing having an attachment flange provided at one of its ends for temporary securing the device on a formwork of the subsequently cast constructional component and a receptacle for isolation means and which surrounds, at least regionwise, an axially extending through-opening.

As isolation means, e.g., a fire-suppression mass, which expands in case of a fire and which closes the opening, can be used. The advantage of such cast-in devices consists in that they provide and integrated protection, e.g., fire protection of the leadthrough from the start of a cast operation through the installation of a conduit up to the completion of the building and covering of the system.

The drawback of the devices described above consists in that they are designed for a single leadthrough for passing a conduit. In contemporary buildings, there are often provided conduit shafts in which several different conduits extend parallel to each other and are arranged closed to each other. Because of a limited space and because of the shape of the devices, in particular of their attachment flanges, the cast-in devices cannot be arranged in a space-optimizing manner. Further, for a sufficient stability of a device, in particular during a constructional phase before casting of the constructional component, each separate cast-in device should be secured to a formwork in four points with nails, screws and the like. With narrow space ratios, this presents a problem.

German Publication DE 24 11 521 A1 discloses an embeddable device for passing conduits through a constructional component and including a tubular housing having an attachment flange provided at one of its ends for temporary securing the device on a formwork of the subsequently cast constructional component, and a receptacle for isolation means and which surrounds, at least regionwise, an axially extending through-opening. On the attachment flange, there is provided a connection device for connecting several of such embeddable devices with each other along the rims either with pins and grooves or with springs and grooves.

The drawback of the device of DE 24 11 521 A1 consists in that with two devices arranged next to each other, in particular with vertically extending leadthroughs, an attachment point provided by the connection device, does not have an adequate stability and does not provide protection against displacement of the devices.

Accordingly, an object of the present invention is to provide an embeddable device for passing conduits through a constructional component and which can form a stable and space-saving cast-in system with at least one further such device.

SUMMARY OF THE INVENTION

This and other objects of the present invention, which will become apparent hereinafter are achieved by providing a connection device for connecting a plurality of embeddable devices with each other and including at least one connection element provided on the housing and extending parallel to a plane defined by the attachment flange at a distance from the plane.

By providing a connection element spaced from the attachment flange, there is provided, upon connection of two devices for forming a cast-in system, an additional attachment point for both devices and which, in connection with two or three attachment points on the attachment flanges, insures a stable and space-saving arrangement of the cast-in system. Such cast-in system is capable to withstand forces acting thereon even at a small number of attachment points on the attachment flange before casting of the constructional component. Of course, the inventive device can be used as a single leadthrough.

Advantageously, the connection device has at least two connection elements provided on the housing and extending parallel to each other. With two connection elements, the connection of two devices is stabilized even more. Advantageously, the free ends of the at least two connection elements extend in the same direction so that two connection points is provided on one side of the device housing.

Advantageously, the connection device is formed as a male-female connection device and, more advantageously, as a releasable male-female connection. With connection devices, which are formed as male-female devices, several devices can be easily connected with each other and disconnected from each other as long as the male-female devices are correspondingly formed.

Advantageously, with a connection device having two connection elements provided on the housing one of the at least two connection elements is formed as a male element of the male-female connection device and another of the at least two connection elements is formed as a female element of the male-female connection device.

The alternative formation of the connection elements insures that an attachment point, which is provided by the connection device, is stabilized even more, which further improves the stability of the entire cast-in system.

Advantageously, the attachment flange has a rectangular base surface, and the at least one connection element extends from the housing at least up to an axial projection of the attachment flange and transverse to a delimitation of the axial projection. Upon assembly of the two devices into a system, the two flanges of the two devices abut each other along their rims, and an appropriate extension of the connection element insures their engagement with each other. The adjoining each other rims of the attachment flanges form a further fixed point, whereby a smaller number of attachment point is necessary for securing several devices, which are connected with each other to form a single cast-in system, to the formwork. Even with narrow space ratios, the cast-in system can, thus, be secured sufficiently reliably and simply.

Advantageously, the connection device has four connection elements arranged in pairs on the housing. The free ends of connection elements of a first pair extend in one direction, and the free ends of connection elements of a second pair extend in an opposite direction. A respective connection element of the first pair and a respective connection element of the second pair form a connection axis. The connection axes extend parallel to the plane defined by the attachment flange at a same distance from the plane.

Advantageously, the connection elements of both pairs are spaced from each other, respectively, by the same distance. As a result, embeddable devices having different diameters of their tubular housings, can be connected with each other despite their different dimensions.

Advantageously, with the connection device being formed as a male-female connection device, one connection element of the first pair is formed as a male element of a male-female connection, and a connection element of the second pair which lies on a same connection axis as the one connection element of the first pair is formed as a female element of the male-female connection.

According to a further advantageous embodiment of the present invention, the connection device has eight connection elements arranged in pairs on the housing at the same distance from the attachment flange and offset relative to each other, respectively, by 90°. The free ends of the connection elements of the pairs of connection elements extend in a direction offset by 90° with respect to the direction in which the free ends of the connection elements of the adjacent pair of connection elements extend. In this embodiment likewise, a connection element of one pair defines, together with a respective connection element of oppositely located pair a connection axis. This insures, in addition to formation of a system with linearly connected embeddable devices, formation of a system with embeddable devices connectable at right angles to each other and spacially connectable embeddable devices and which can be simply assembled and is characterized by a good stability.

According to the present invention, the connection device can include connection elements which are axially offset relative to each other, being spaced by different distances from the plane defined by the attachment flange.

Thereby, with the embeddable device being secured on a formwork, additional attachment points located at different distances from the formwork are provided. The additional attachment points noticeably improve the stability of a cast-in system with such connection devices for thick constructional components.

According to the invention, at an end of the housing remote from the end with the attachment flange, coupling means in form, e.g., of an inner thread can be provided. With such coupling means, an extension tube having, e.g., an outer thread corresponding to the inner thread formed in the housing, can be connected. With an extension tube, the difference between the longitudinal extent of an embeddable device and the thickness of the to-be-cast constructional component can be compensated.

Advantageously, the housing can have two housing parts extending both in an axial direction, and a connection device for connecting the housing parts. Thereby, e.g., already mounted conduits can be equipped with the inventive device, without the need to displace the device from a free end of the conduit to the location of the leadthrough.

With a modular system for passing conduits through a constructional components, the above-discussed embodiment is particularly advantageous, in particular when the connection device has four connection elements provided on the housing in pairs, with each pair having one connection element formed as a male element of the male-female connection device, and another of the at least two connection elements is formed as a female element of the male-female connection device.

Thereby, only one type of a half-shell should be formed, which is assembled, on the constructional site, with another identical half-shell to form a housing. With this embodiment also, coupling means, e.g., in form of an inner thread can be provided at an end of the housing part opposite the housing part end with the flange section. Thus, in the assembled condition of the housing, a coupling section for an extension tube is formed.

Advantageously, the connection device for connecting the two housing parts has two snap-on devices arranged on respective connection rims of the two housing parts. Each snap-on device has at least one snap-on element and at least one receptacle for receiving the snap-on element.

Advantageously, on each housing part there are provided at least one snap-on element and at least one receptacle. Thereby, a housing part can be formed that can be easily assembled with an identical housing part. For a particularly stable connection of two housing parts, it is advantageous to provide, on the connection rim of each housing part two snap-on elements or two receptacles for receiving the snap-on elements.

Advantageously, the embeddable device is formed of a plastic material, in particular, by an injection-molding process. This insures a cost-effective manufacturing of the inventive embeddable device. With the plastic material, the connection device is also produced with low costs. This is particularly advantageous in mass production in which the embeddable device according to the present invention is produced.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENTS

Figure 1:
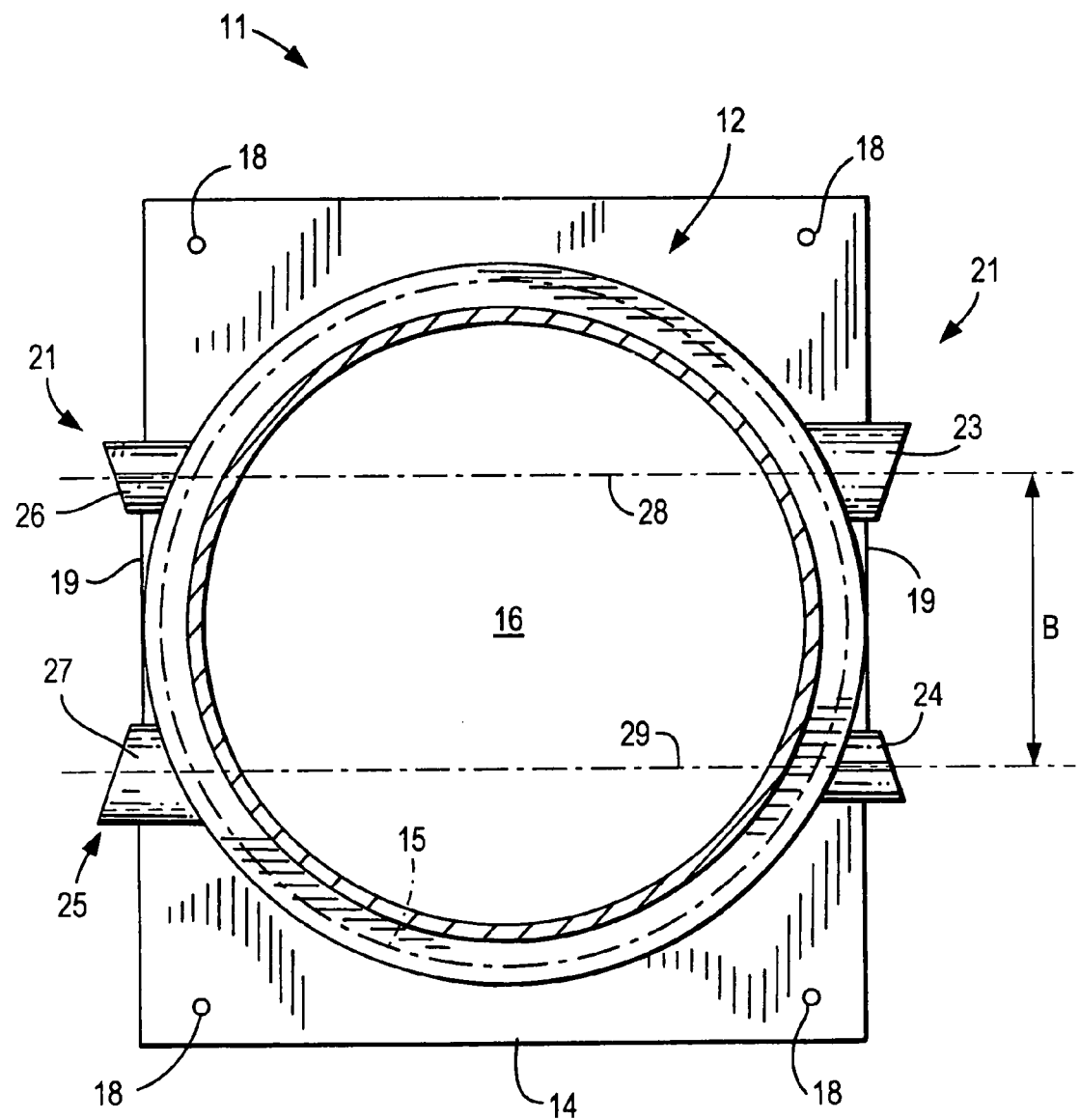
FIG. 1 a plan view of a first embodiment of an embeddable device according to the present invention.
Figure 2:
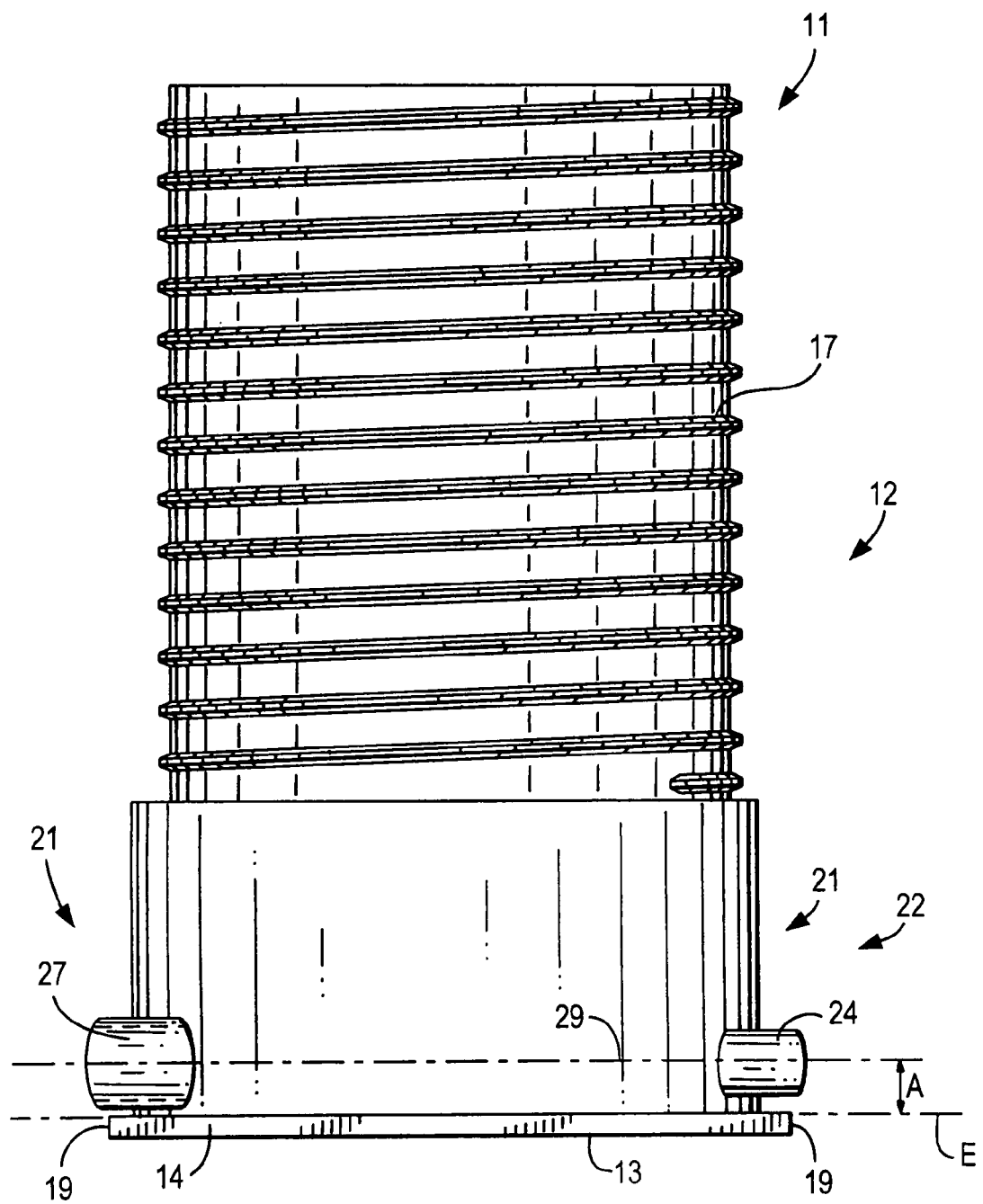
FIG. 2 an elevational view of the embeddable device shown in FIG. 1.

An embeddable device 11 according to the present invention for passing of conduits through constructional components, which is shown in FIGS. 1-2, includes a tubular housing 12 at an end 13 of which, there is provided an attachment flange 14 for a temporary preliminary mounting of the device 11 on a formwork of a subsequently cast constructional component. The attachment flange 14 projects in a direction transverse to the longitudinal extent of the tubular housing 12, beyond the tubular housing 12. The tubular housing 12 further includes a receptacle 15 for isolation means and which surrounds, at least regionwise, a through-opening 16 extending in the axial direction of the housing 12. The attachment flange 14 has a rectangular base surface in the corner regions of which, there are provided, respectively, holes 18 for nails, screws and the like for securing the device 11 on the formwork. For an improved anchoring of the device 11 in the cast constructional component, the housing 12 has an outer shaped profile 17.

On the housing 12, there is provided a connection device 21 for connecting a plurality of devices 11 together. The connection device 21 has four connection elements 23, 24, 26, 27 that extend parallel to a plane E, which is defined by the attachment flange 14, at a distance from the plane E, and that also extend parallel to each other. The connection elements 23, 24, 26, 27 are arranged in pairs on the housing 12 at the same distance A from the plane E, with the free ends of connection elements 23, 24 of the first pair 22 extending in one direction, and the free ends of the connection elements 26, 27 of the second pair 25 extending in the opposite direction. A respective connection element 23 or 24 of the first pair 22 and a respective connection element 26, 27 of the second pair 25 define together a respective connection axis 28 or 29. The distance B between the first axis 28 and the second axis 29 is so selected that devices having different diameters of their housing and provided each with the connection device 21, can be displaced together. The connection elements 23, 24, 26, 27 extend from the housing 12 and project beyond the axial projection of the attachment flange 14, transverse to the delimitation of the axial projection of the attachment flange 14.

The connection device 21 is formed as a male-female connection device. The connection element 24 of the first pair 22, which lies, together with the corresponding connection element 27 of the second pair 25 on the connection axis 29, is formed as a male element of the connection device, e.g., in form of a pin. The connection element 27 of the second pair 25 is formed as a female element of the connection device, e.g., in form of a receptacle such as, e.g., a bore. The connection element 23 of the first pair 22, which lies, together with the corresponding element 26 of the second pair 25, on the connection axis 28m, is formed as a female element of the connection device, e.g., in form of a receptacle. The connection element 26 of the second pair 25 is formed as a male element of the connection device, also in form of a pin.

Figure 3:
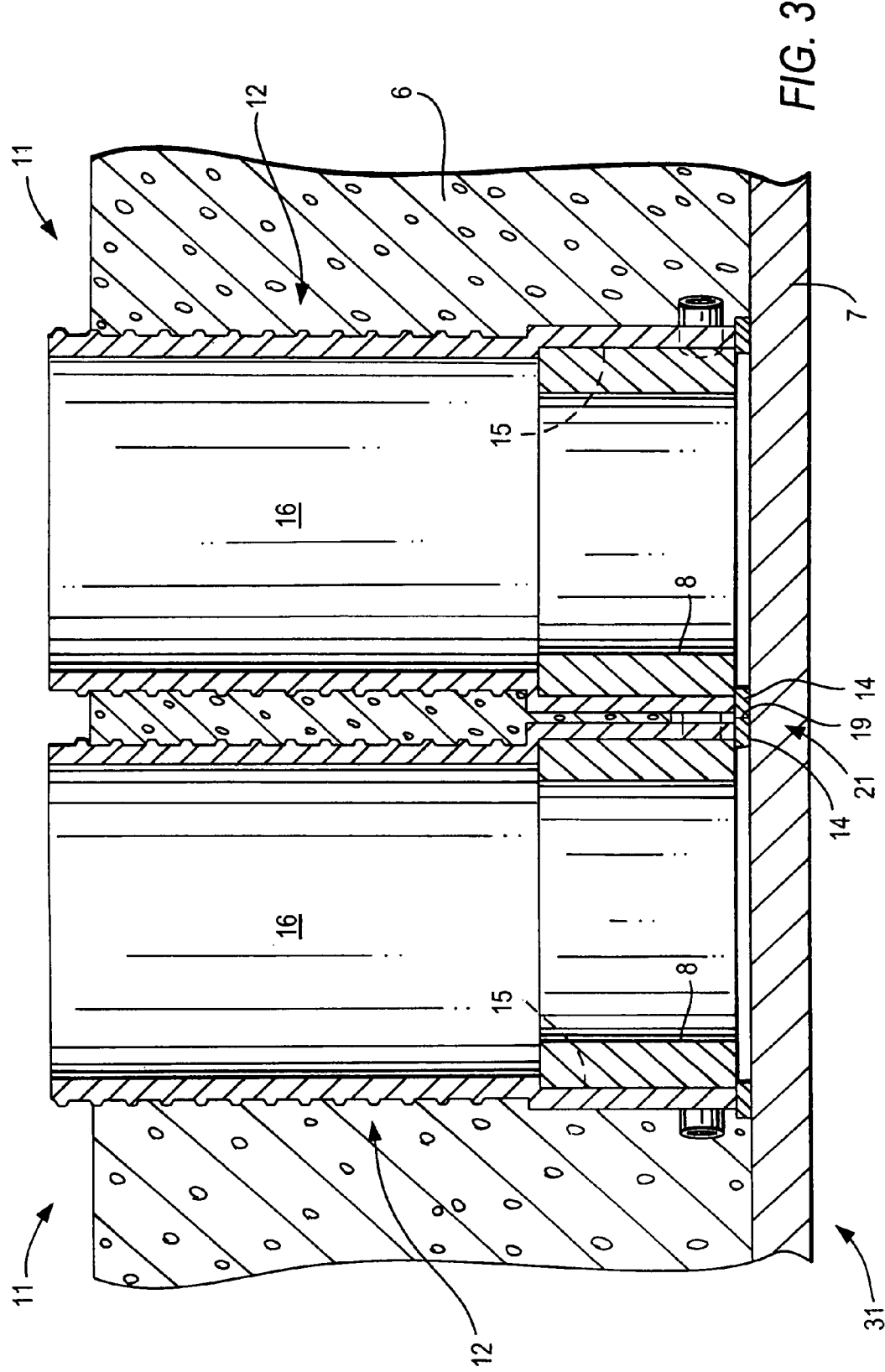
FIG. 3 a cross-sectional of two embeddable devices of the first embodiment connected with each other.

FIG. 3 shows a cast-in system 31 located in a cast constructional component 6. The cast-in system 31 is formed of two, connected with each other devices 11 shown in FIG. 1-2. The two devices 11 are connected by the connection device 21, with the attachment flanges 14 of the two devices 11 abutting each other along a rim 19. The cast-in system 31 can be easily secured on the formwork 7 with two-three nails. With the additional attachment point provided by the connection device 21, the cast-in system 31 is reliably secured. The isolation means 8, which is provided in the receptacle 15 of the housing 12, includes an intumescent material that closes the opening 16 in case of fire.

Figure 4:
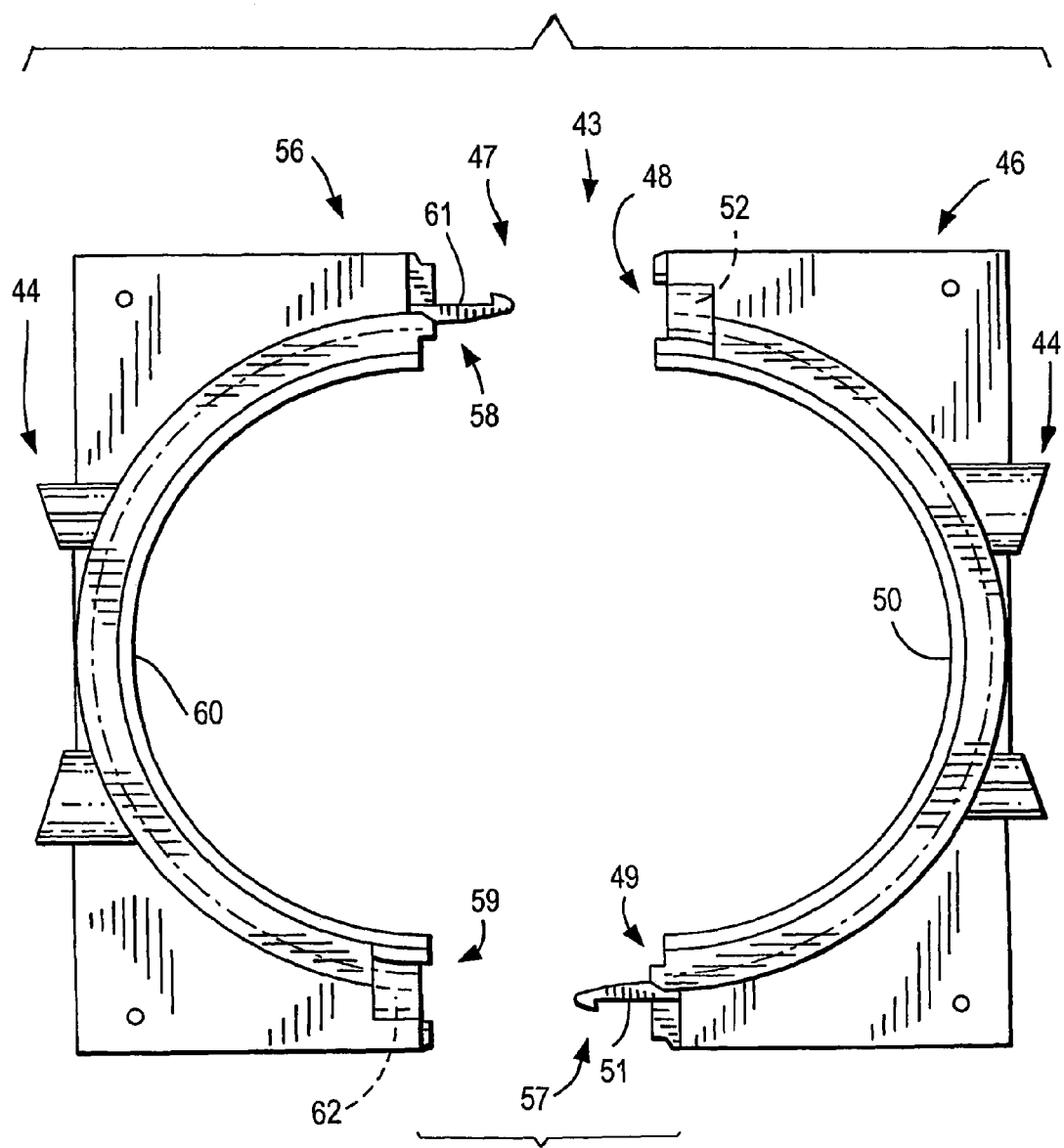
FIG. 4 a plan view of a second embodiment of an embeddable device according to the present invention.
Figure 5:
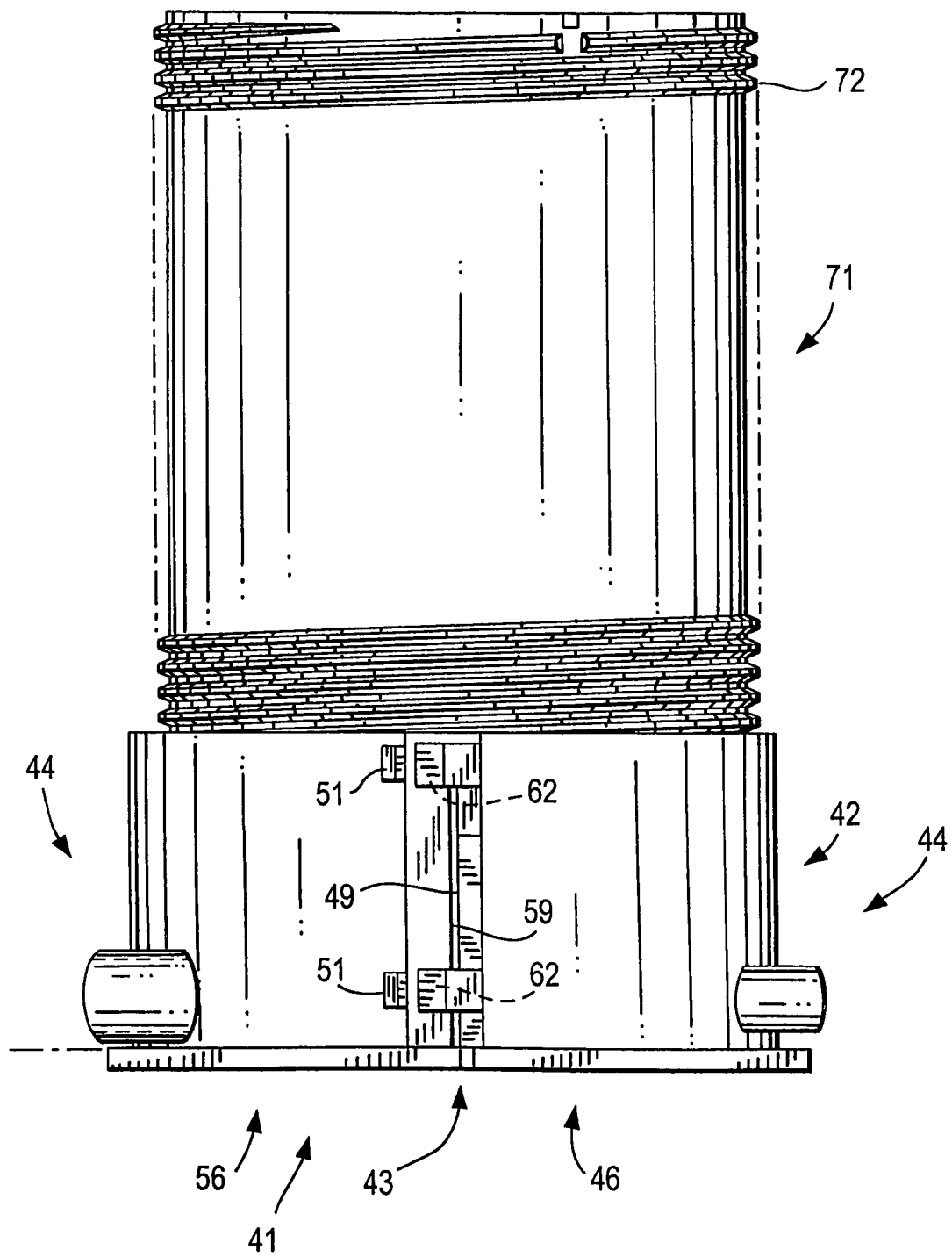
FIG. 5 an elevational view of the embeddable device shown in FIG. 4.

FIGS. 4-5 show another embodiment of the device according to the present invention. The device 41, which is shown in FIGS. 4-5, includes extending in the axial direction, first and second housing parts 46, 56 which are connectable together to form a housing 42 by two connection devices 43 formed as snap-on connection devices 47, 57. Each of the first and second housing parts 46, 56 has a connection device 44 that is formed analogous to the connection device 21 of the device 11 shown in FIGS. 1-2. The first and second housing parts 46, 56 further have each a threaded section 50, 60, respectively, which together form connection means for an extension tube 71 having an outer thread 72.

The snap-on device 47 is arranged on a connection rim 48 of the first housing part 46 and on the connection rim 58 of the second housing part 56. The connection rims 48, 58 abut each other in the assembled condition of the first housing part 46 and the second housing part 56. The snap-on device 47 has two snap-on elements 61 provided on the second housing part 56, and two receptacles 52 for the snap-on elements 61 and which are provided on the first housing part 46.

The snap-on device 57 is arranged on a connection rim 49 of the first housing part 56 and on the connection rim 59 of the second housing part 56. The connection rims 49, 59 abut each other in the assembled condition of the first housing part 46 and the second housing part 56. The snap-on device 57 has two snap-on elements 51 provided on the first housing part 46, and two receptacles 62 for the snap-on elements 51 and which are provided on the second housing part 56.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A device (11, 41) embeddable in a to-be-cast constructional component for passing a conduit therethrough, the device comprising a tubular housing (12, 42) having an axial through-opening (16) through which the conduit is extendable, and having a receptacle (15) provided therein for receiving isolation means (8) for surrounding, at least regionwise, the through-opening (16) for protecting the tubular housing (12, 42) in case of fire; an attachment flange (14) provided at one end of the tubular housing (12) for temporarily securing the device to a formwork of the to-be-cast constructional component (6) and including means that provides for securing of the attachment flange, together with the housing, to the formwork; and a connection device (21, 44) for connecting the device (11, 41) with at least one other embeddable device (11) and including at least one connection element (23, 24, 26, 27) provided on the tubular housing (12) and extending parallel to a plane (E) defined by the attachment flange (14) and spaced from the attachment flange.

2. A device according to claim 1, wherein the connection device (21, 44) has at least one further connection elements (23, 24, 26, 27) provided on the tubular housing (12) and extending parallel to the at least one connection element.

3. A device according to claim 2, wherein the connection device (21, 44) is formed as a male-female connection device.

4. A device according to claim 3, wherein one of the at least one connection element (24, 26) and at least one further connection element is formed as a male element of the male-female connection device, and another of the at least one and at least one further connection elements (23, 27) is formed as a female element of the male-female connection device.

5. A device according to claim 1, wherein the attachment flange (14) has a rectangular base surface, and the at least one connection element (23, 24, 26, 27) extends from the tubular housing (12) parallel to an end surface of the attachment flange (14) extending transverse to an attachment flange plane (E) and transverse to a tubular housing axis.

6. A device according to claim 1, wherein the connection device (21) has altogether four connection elements (23, 24, 26, 27) arranged in pairs on the tubular housing (12), wherein free ends of connection elements (23, 24) of a first pair (22) extend in one direction and connection elements (26, 27) of a second pair (25) extend in an opposite direction, wherein a respective connection element (23, 24) of the first pair (22) and a respective connection element (26, 27) of the second pair (25) form a connection axis (28 or 29), and wherein the connection axes (28, 29) extend parallel to the attachment flange plane (E) at a same distance (A) from the plane (E).

7. A device according to claim 6, wherein one connection element (24) of the first pair (22) is formed as a male element of a male-female connection, and a connection element (27) of the second pair (25), which lies on a same connection axis (26) as the one connection element (24) of the first pair (22), is formed as the female element of a male-female connection.

8. A device according to claim 1, wherein the tubular housing (42) has first and second housing parts (46, 56) extending both in an axial direction, and a connection device (43) for connecting the first and second housing parts (46, 56).

9. A device according to claim 8, wherein the connection device (43) for connecting the first and second housing parts (46, 56) comprises two snap-on devices (47, 57) arranged on respective connection rims (48, 49, 58, 59) of the first and second housing parts (46, 56) and wherein each snap-on device (47, 57) has at least one snap-on element (51, 61) and at least one receptacle (52, 62) for receiving the snap-on element (51, 61).

10. A device according to claim 9, wherein there are provided, on one of the first and second housing parts (46, 56) the at least one snap-on element of one of the two snap-on devices (47, 57) and the at least one receptacle (52, 62) of another of the two snap-on devices (47, 57).

11. A device according to claim 1, further comprising isolation means (8) located in the receptacle (15).

12. A device according to claim 1, wherein the receptacle (15) is formed by a circumferential recess in an inner wall of the tubular housing (12).

13. A device according to claim 1, wherein the at least one connection element (23, 24, 26, 27) is spaced from the attachment flange.

* * * * *